Aug. 12, 1969  JAMES E. WEBB  3,460,995
ADMINISTRATOR OF THE NATIONAL AERONAUTICS
AND SPACE ADMINISTRATION
METHOD AND DEVICE FOR DETERMINING BATTERY STATE OF CHARGE
Filed Sept. 15, 1967
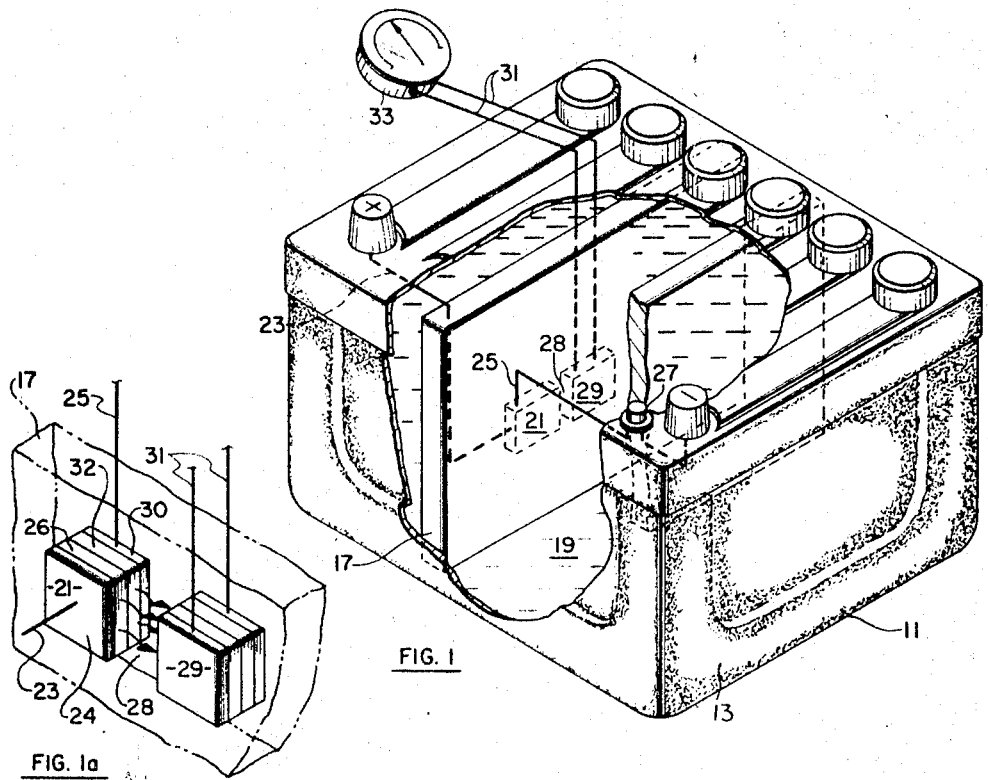
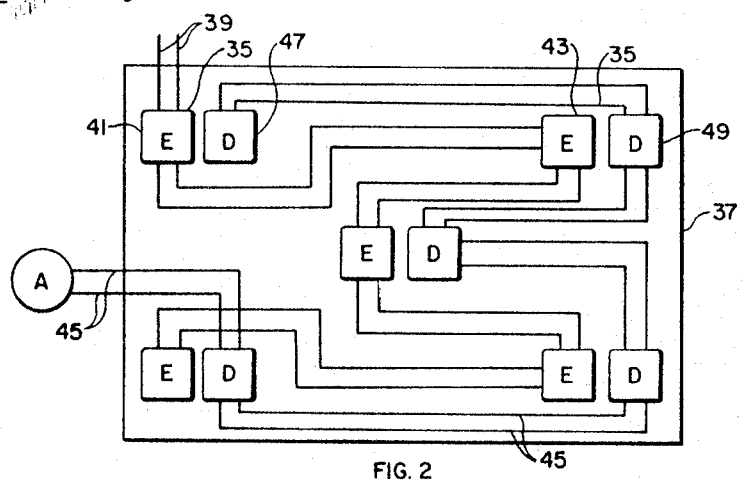
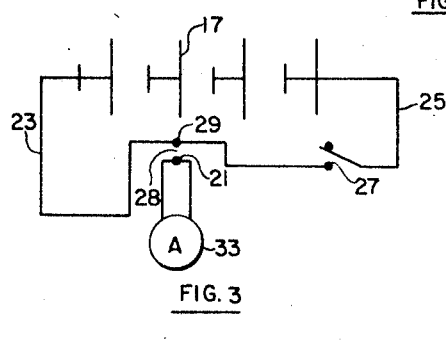
*INVENTOR.*
STANLEY J. KRAUSE
BY
ATTORNEYS United States Patent Office 3,460,995
Patented Aug. 12, 1969

3,460,995
METHOD AND DEVICE FOR DETERMINING BATTERY STATE OF CHARGE
James E. Webb, Administrator of the National Aeronautics and Space administration, with respect to an invention of Stanley J. Krause, Sepulveda, Calif.
Filed Sept. 15, 1967, Ser. No. 668,249
Int. Cl. H01m 45/06
U.S. Cl. 136—182                                  9 Claims

ABSTRACT OF THE DISCLOSURE

A state-of-charge indicator device for use with wet cell batteries having at least one light emitter and light detector disposed adjacent to each other imbedded within a plate of the battery wherein the light emitter is selected to emit a wavelength of light which would be absorbed only by either the discharge compound formed in the plate or the charge compound formed, such that the detector which is connected to a suitable instrument will indicate the amount of light.

ORIGIN OF INVENTION

The invention described herein was made in the performance of work under a NASA contract and is subject to the provisions of section 305 of the National Aeronautics and Space Act of 1958, Public Law 85-568 (72 Stat. 435; 42 U.S.C. 2457).

BACKGROUND OF THE INVENTION

Field of the invention

This invention lies in the field of detecting the condition of a battery. Particularly, the device provides a means for continuously monitoring either the discharge state or charge state of the battery in which it is used, thus reflecting the capacity of the battery at a given time.

Description of the prior art

Prior to the herein invention, there was no known means for determining the state of charge or discharge of a battery and thus its condition. What prior art devices existed did not give an essentially instantaneous quantitative measurement of the battery condition. These prior art devices were merely qualitative means for giving indication of the overall condition of the battery; however, they were not means for giving an actual instantaneous quantitative measurement in amp-hours of the battery state. Typical of such prior art devices are amp-hour meters and hydrometers. These are only suitable for lead-acid batteries. No practical and effective detectors are known for silver-cadmium, nickel-cadmium and silver-zinc batteries.

In addition to the fact that the few limited prior art devices do not give the same type of measurement as provided by the instant invention, they are not as accurate or as suitable to many applications which will be herein enumerated. These devices also had other deficiencies. Some of the such devices could not be left in the battery or permanently attached thereto. Others required external power sources in order to give a reading determination. Some devices would interfere with the function of the battery during the period of measurement, and for this reason could not be permanently affixed to the battery. In view of the foregoing, numerous schemes have been proposed and some actually attempted to provide a practical state-of-charge indicator. However, none of these has been known to meet with success. The herein device essentially overcomes the above deficiencies and provides a useful device, as will be shown in detail.

Thus it is an object of this invention to provide an indicator which will give an instantaneous reading of the condition of a battery.

A further object of this invention is to provide a device and method for indicating either the state of charge or discharge of a battery, which device is lightweight and can be easily incorporated within the battery without affecting its performance.

One further object of this invention is to provide a device and method for indicating the condition of a battery which can be powered by the battery itself needing no external source.

Still another object of this invention is to provide a device and method for determining the condition of the battery which can serve as a means for continuously monitoring the charge or discharge thereof through an indicator device.

Still one other object of this invention is to provide a device and method for measuring the condition of a battery which device has no moving parts and is inexpensive to manufacture while producing a high degree of accuracy.

An additional object of the invention is to provide a novel method of detecting the state of charge of a battery.

SUMMARY OF THE INVENTION

The above and other objects of this invention are accomplished by a novel device utilizing a semiconductor light emitter and corresponding photodetector. The semiconductor emitter is connected to an electrical source which can be the battery terminals whereby a coherent light beam is emitted therefrom. The receiver is preferably of the same semiconductor material. It in turn can be connected to a milliammeter in order to give a reading. The emitter and detector are extremely small and can be imbedded within a battery plate spacially disposed from one another such that the light from the emitter will travel through a gap in the plate to the surface of the detector element.

The theory of operation of the device is based on the fact that during its life a wet cell battery undergoes a chemical reaction and change within the plates thereof. During a charge condition, one compound is formed in the plate while in a discharge state, another compound is formed. Each of the compounds for any type of battery would possess different absorption characteristics in their infrared spectrum. Thus, for a given battery, a semiconductor emitter is selected which will produce light at a wavelength which is absorbed by either the discharge or charge formed compound in a battery plate, yet will not be absorbed by the other of the possible compounds formed or any of the surrounding substances. Thus all other substances than the one desired to be measured will let the emitted light pass through to the receiver. However, as soon as the to-be-measured compound is formed, there is an effect on the receiver since a portion of the light will be absorbed. The amount of light being absorbed will be a function of the amount of compound formed. Thus, one can easily correlate the discharge or charge of the battery corresponding to the amount of charge or discharge compound being formed at a given instant. This will be explained in further detail in the description to follow.

A plurality of sets of emitters and receivers can be disposed in a single plate while each cell of the battery can have at least one such plate therein. Thus it is contemplated that, for example, one plate in each cell of the battery will have a plurality of units disposed therein so that one can get a determination of the performance of each cell within the battery since the reading of a plate within a cell will give an excellent indication of the total performance of this cell. It is believed the invention will be better understood from the following detailed description and drawings in which:

FIG. 1 is a partially sectioned pictorial representation of a battery showing the device of this invention mounted in one of the plates thereof.

FIG. 1a is a detailed view of the emitter and detector of this invention imbedded within a battery plate.

FIG. 2 is a schematic representation of five units of the invention mounted in parallel within a battery plate.

FIG. 3 is a schematic representation of an electrical circuit for the device of this invention.

DESCRIPTION OF PREFERRED EMBODIMENTS

The theory of this invention is related to the fact that different compounds are formed in the plates of the battery depending upon the charge or discharge condition. For example, in a nickel cadmium battery or cell, nickelous hydroxide, $Ni(OH)_2$, is the positive plate, while cadmium is the negative plate. Potassium hydroxide is the electrolyte. In a completely discharge condition, the positive plate is 100% nickelous hydroxide, and while the battery charges the nickelous hydroxide is converted to nickelic hydroxide, NiOOH. The amount of nickelic hydroxide present in the battery plate is directly proportional to the amount of charge. Thus, in the plate of this battery there is the reversible reaction

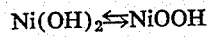
$$Ni(OH)_2 \leftrightarrows NiOOH$$

In a lead acid battery, fo rexample, the positive plate is lead sulphate, $PbSO_4$, while the negative plate is lead. In the positive plate there occurs the reaction of

$$PbSO \leftrightarrows PbO_2$$

The electrolyte as is known is sulphuric acid. Thus, in this battery the discharge compound is lead sulphate, while the charge compound is lead dioxide.

A further example of a typical battery is the silver-zinc one, wherein the positive plate is silver and the negative plate is zinc. The electrolyte commonly used in such a battery is potassium hydroxide. In this battery, the positive plate is, as indicated, pure silver in the discharge condition. This goes to $Ag_2O$ which is the first stage and eventually goes to AgO where the silver has a +2 valence state. The reaction is $Ag° \rightarrow Ag_2O \rightarrow AgO$. It can thus be seen that it would be best to measure the amount of pure silver, Ag, present so as to avoid the problem concerning the two oxidized silver compounds.

In all of the three foregoing batteries, the discharge compounds have a different infrared spectrum than the charge compound formed.

For purposes of the discussion of this invention, reference will be particularly made to the silver-zinc battery as a typical example. In this battery, it is best that the emitter and receiver be imbedded in the positive plate, that is, the silver plate. It is often found in batteries that the positive plate will be the most suitable one, although it does not make any difference which of the two plates are used normally. However, in the silver-zinc battery, the zinc plate unlike the silver one has a binder to bind the metal particles, which is opaque and made of a material such as Teflon or polyvinyl alcohol. Additionally, other interfering compounds are present for preventing gassing and the like. The additional materials will all tend to prevent the passage of the light from the emitter to the detector and obviously interfere with the operation of the device. In view of this, it is preferred to use the silver or positive plate which does not have such interfering elements present. Each compound used in forming the plates of the battery has an infrared light absorption band or pattern peculiar to that compound, as previously indicated. In other words, each compound will have its own peculiar spectrum displaying different absorption bands at different wave lengths in the infrared region. The presence of a given compound decreases the passage through that compound of the radiation intensity of its related absorptive wave length in accordance with the following formula:

$$I = I_0 e^{-\alpha x}$$

I = transmitted intensity
$I_0$ = source intensity
$\alpha$ = absorption coefficient
$x$ = amount of material absorbing
$e$ = logarithmic constant Thus, by utilizing a device of this invention to emit and detect a wave length that will be absorbed by either a charge or discharge associated compound of the plate of the battery, one can obtain an electrical measurement of the intensity of the light passing through a known volumetric amount of the compound. Since this intensity in turn is directly related to the amount of that compound formed in the volumetric region concerned, one then knows the state of the charge or discharge of the battery.

The emitters and detectors of this invention are semiconductor devices which are well known in the art and are described in detail in an article entitled Semiconductor Light Emitters by F. Joseph Reid in Battelle Technical Review, March 1967, vol. 16, No. 3, pages 3–9. The semiconductor devices are actually lasers in that they emit coherent light. They are formed of a semiconductor sandwiched between two metal electrical contacts. One of the contacts is affixed to the p-type region of the semiconductor material while the other metal contact is affixed to the n-type region. A line which will conduct electricity into the semiconductor is affixed to the contact connected to the p-type region. As explained in the reference, when voltage is applied to the semiconductor, coherent light will be emitted at the p-n junction. In order to achieve this, the p-type end should be positive while the n-type end is negative. As a result, the voltage is applied in a forward direction. This results in the excess electrons that diffuse into the p-region and the excess holes that diffuse into the n-region recombining in the space charge region of the junction. As explained, some of the photons, or light, released by the recombination are emitted in the form of the laser. Other photons are reflected back into the semiconductor by the two flat, parallel cleaved surfaces adjacent the metal contacts that constitute the laser faces. On each passage through the space charge region, the reflected photons are amplified, establishing a mode of oscillation and producing coherent radiation that emerges through the cleaved surfaces as monochromatic lights. This is, of course, further explained in detail in the reference article which is herein incorporated by reference. Such is illustrative of one type of semiconductor emitter. Other suitable forms can be utilized. These devices enable one to produce a coherent light beam at a chosen wave length from an extremely small device. The wave length of light emitted from the semiconductor material is directly releated to the choice of material to be used. The detector is identical to the emitter and will be spacially displaced therefrom in the plate, as will be shown in the drawings. For example, in the silver-zinc battery, the pure silver plate in the discharge condition absorbs strongly at an infrared wave length of 15 microns. Alternatively, at this wave length, none of the other compounds, including the silver oxide charge compounds formed and the electrolyte potassium hydroxide, absorb significantly at this frequency. A semiconductor material, lead-tin-telluride, PbSnTe, produces a coherent beam of 15 microns wavelength. Thus a semiconductor material of this composition would be suitable for placement in the silver plate of a silver-zinc battery as both the light emitter and detector. Alternatively, the charge compound formed, $Ag_2O$, absorbs strongly between 7 and 7.4 microns. Thus, if one were to measure the $Ag_2O$ formed, a device that emits at this wave length would be chosen.

Turning now to FIGS. 1 and 1a, there is seen a typical wet cell battery 11, having a housing 13. Shown disposed in the housing 13 is a battery plate 17. For purposes of this example, plate 17, having the device of this invention imbedded therein, is a positive plate of silver in a silver zinc battery. Electrolyte solution 19, which would be potassium hydroxide in this example, fills the battery housing 13. A photoluminescent or emitter device 21 is disposed in the midportion of the plate and imbedded therein. Two leads are connected to the device, one lead 23 is connected to the positive terminal of the battery, while the other lead 25 is connected to the negative terminal of the battery preferably through a switch means 27. The positive lead 23 is attached to a metal contact 24 affixed to the p-section 26 of the emitter, and the negative lead 25 to a metal contact 30 affixed to the n-section 32. The leads 23 and 25 respectively would preferably be made out of silver so as to be compatible with the battery. Obviously, in other types of batteries the leads would be chosen to also be compatible with the material of construction. Disposed adjacent to the emitter device 21 and spacially displaced therefrom at a gap 28 is the detector 29. Two leads 31 are directed from the detector to a milliammeter 33. Essentially the detector 29 is a photovoltaic device, though as indicated it is preferably of the same construction as the emitter. The photovoltaic output which is conducted through lines 31 will give a direct correlation between the output current and the intensity of the transmitted light. Like the emitter, one line is connected to the p-section of the detector and the other to the n-section. Suitable measuring instruments other than a milliammeter could be utilized. Additionally, circuitry can be incorporated to amplify the signal contained in the detector 29. The electrical circuit diagram corresponding to the foregoing description is seen in FIG. 3.

It is pointed out that in the operation of a wet cell battery, considerable deterioration can occur within the unit before there is an effective decrease in output voltage. As the battery so ages, the voltage drops off very slightly. Thus, the emitter device of the invention can be sufficiently run by the battery. Once the voltage has begun to drop, the battery is generally considered to be nearly useless. The purpose of the herein device is to give an indication of the battery condition relative to the point where the voltage begins to drop. Further, as the emitter device continues in operation, it will heat up and thus decrease in resistance to the current. The slight voltage drop that can occur during the operation of the battery prior to the point where it significantly drops is thus compensated for by this resistance drop, so that the device will have an essentially constant power source.

The gap 28 between the detector and emitter could, for example, be 200 microns. However, this gap will depend upon the intensity of light that is achieved in a given plate. Intensity is related to the power input to the emitter as well as the material of the emitter and the construction of the material in the plate.

Battery plates are normally made by pressing a powder of the metal used upon a central grid which serves as a current collector and support structure for the powder, using conventional powder metallurgical techniques. It is contemplated that the wafer-thin semiconductor laser device of this invention will be laid upon the grid used to form the battery plate prior to the powder being pressed thereon. After the proper spacing between the emitter and detector is achieved, the powder will then be pressed on the grid around the emitter and detector imbedding them within the plate. Alternatively, after a plate is formed, the area to be occupied by the emitter and detector can be machined out of the plate and the detector and emitter imbedded therein. As can thus be readily appreciated, the metal battery plate is relatively porous and must be so in order to allow the electrolyte to permeate it in the course of the operation of the battery. The porous material between the emitter and detector will be a volume which will have a calculated absorption. This porosity further enables the transmission of the radiation between the emitter and receiver elements of the device. To protect the elements of the device from attack by corrosive acid or other electrolyte utilized, it might be desirable to encapsulate it in a plastic which would not absorb light at the desired frequency, such as an acrylic resin.

In order to obtain even a more accurate reading of the condition of a battery, a plurality of emitter and receiver elements can be disposed within a plate. As seen in FIG. 2, it would be most preferable to utilize five sets of elements. As shown, the sets 35 are disposed such that there is one in each corner of the plate 37 with an additional one located in the center thereof. As shown, the four sets of devices are connected in parallel in this embodiment, wherein two leads 39 are directed to the first emitter 41. From there, the leads are then directed to the second emitter 43, and so on. The two leads 39 are attached across the terminals of the battery in the same manner as shown in FIG. 1. Likewise, the two leads 45 which are affixed to the meter device are connected to the first detector 47, passing on to the second detector 49, and likewise throughout the device. One advantage of the parallel connection between the elements is that there is a tendency to amplify the signal. However, the same elements can be successfully connected in a series arrangement.

A typical battery could have twelve positive plates in a cell. This battery, for example, could have eighteen cells. It would be desirable to put one set of detectors on one plate per cell of the battery. Since the plates within the cell are in parallel, the condition of one plate will reflect that of all the plates in the cell. Thus, by having one plate in each cell utilizing the device of this invention, one can obtain the condition of each cell of the battery. A switch mechanism could be utilized to switch between the leads coming out of the various plates in the battery, so that one can selectively take a measurement of each of the eighteen cells.

It is contemplated for outer space applications that the devices of this invention might not necessarily be powered by the battery itself so as to minimize any drain thereon. Rather, solar energy, for example, could be utilized to power the detectors. The device of this invention is, however, not limited to space applications. Such an indicator can be used for automobile batteries, reserve power or standby systems, or military field applications.

Though it should be obvious, the correlation of the light detected to the condition or state of charge of the battery can be readily calibrated. For example, in a given battery such as the silver zinc one, one would obtain a reading at a fully 100% charge condition on the milliammeter and then discharge the battery at various levels, starting for example by obtaining a second reading at a discharge of 25% of the battery, and then a 50% discharge, etc., down through a fully discharged condition. Thus, the milliammeter will be calibrated to indicate the actual state-of-charge of the silver-zinc battery and this scale could be applied generally to this type of battery. Thus if one were to use a lead tin telluride emitter at a fully charge condition, the silver plate would be 100% AgO, which transmits the 15 micron wavelength so that the milliammeter would read at its maximum level, whereas at a fully discharge condition the plate would be pure silver with most all of the light being absorbed by the material. Thus, the milliammeter would read at its lowest point.

While the method and device of this invention have been described and illustrated in detail, it is to be clearly understood that this is intended for the purposes of illustration and example only and is not to be taken by way of limitation, the spirit and scope of this invention being limited only by the terms of the following claims.

What is claimed is:

1. A state-of-charge indicator in combination with a wet cell battery having positive and negative porous plates disposed in a suitable electrolyte wherein the composition of the plates vary depnding upon the state of charge of the battery, means disposed in at least one plate of said battery for emitting infrared light at a wavelength that corresponds to a point of high absorbence by one of the compounds formed in said plate during the functioning of said battery, means disposed in said plate spacially displaced from said infrared emitting means for detecting said emitted light, and means connected to said detector responsive to the amount of light detected.

2. The device of claim 1 wherein said emitter emits at a wavelength corresponding to a point of high absorbence of the charge-associated compound formed in the plates of said battery.

3. The device of claim 1 wherein said emitter emits at a wavelength corresponding to a poin tof high absorbence of the discharge-associated compound formed in the plates of said battery.

4. The device of claim 1 wherein said battery is provided with external positive and negative terminals and further including means for connecting said emitter to said terminals of the battery to power said emitter.

5. The device of claim 1 further comprising:

a plurality of sets of emitters and associated detectors disposed within a plate of said battery.

6. A method of determining the state of charge of a wet cell battery comprising:

emitting infrared light at a wavelength that corresponds to a point of high absorbence by one of the compounds formed in a battery plate during the operation of the battery, passing said light through a portion of a battery plate, and detecting the light that has passed through said portion, whereby said detected light is correlated to the state of charge.

7. The method of claim 6 further comprising:

emitting and detecting said light simultaneously in differing portions of a battery plate.

8. The method of claim 7 wherein said light is emitted at a wavelength that will be predominantly absorbed only by the discharge-formed compound in the battery plate.

9. The method of claim 7 wherein said light is emitted at a wavelength that will be predominantly absorbed only by the charge-formed compound in the battery plate.

References Cited

UNITED STATES PATENTS 3,317,352    5/1967    Webb _____ 136—182

ALLEN B. CURTIS, Primary Examiner

D. L. WALTON, Assistant Examiner

U.S. Cl. X.R.

250—222